Patented Nov. 1, 1932

1,886,242

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

COMPOSITIONS CONTAINING A SYNTHETIC RESIN OR BALSAM

No Drawing.        Application filed December 2, 1927.  Serial No. 237,340.

This invention relates to a composition containing a synthetic resin or balsam, with or without a cellulose ester or ether or other compound of cellulose soluble in organic solvents.

The preferred form of the resin or balsam is a benzoic complex. Thus, I may prepare a resin in the following manner:

|  | Parts by weight |
|---|---|
| Benzoic acid | 61 |
| Succinic acid | 59 |
| Glycerol | 46.5 |

This mixture of raw materials is heated to about 290° C., the temperature being raised gradually and the final temperature being reached in about one hour. After heating a few minutes at 290° C., but not long enough to form insoluble substances, the resin which results is poured out in thin layers onto a cold surface to chill it rapidly. This resin is very light in color and is exceptionally tough. It blends well with nitrocellulose and can be used advantageously with cellulose acetate to make coating compositions. Thus I may use from 1 to 2 parts of the resin, to say, 2 parts of cellulose acetate. In employing the latter compound I require a solvent in which the acetate dissolves readily and in which also the resin is soluble. Thus, illustratively, I may use a mixture of acetone 10 vols., ethyl oxybutyrate 30 vols., and ethylene dichloride 60 vols. Lacquers made from cellulose acetate and the benzoic complex may be used to advantage, especially in applications where the inflammability of cellulose nitrate is objectionable.

As stated in Serial No. 142,532 (page 26) the acetone-soluble cellulose acetate may be employed with benzoic phthalic glyceride resin or various other benzoic resins. Also, mixtures of nitrocellulose and cellulose acetate may be employed in some cases.

Instead of using benzoic acid with a dibasic acid such as succinic acid, I may form a benzoic derivative such as toluyl benzoic acid or benzoyl benzoic acid.

Thus, 120 parts by weight of toluyl benzoic acid are heated with 15.5 parts 98 per cent glycerol. The reaction is preferably conducted in an aluminum vessel equipped with an air-cooled reflux condenser of such length as to allow free escape of steam but return of glycerol and acid to the vessel. An inert gas such as carbon dioxide or nitrogen may be passed into the reaction mixture to provide agitation and to minimize discoloration. The temperature preferably is brought to about 290–300° C. and is held at that point for a period ranging from one-half hour to one hour. The product obtained in this manner was a hard resin having an acid number of 23.4 and was found to be freely soluble in the various mixed solvents for cellulose acetate.

A lacquer solution may be made in the following manner, the proportions being in parts by weight:

| | |
|---|---|
| Cellulose acetate film scrap | 5 |
| Toluyl benzoic glyceride resin | 10 |
| Triacetin | 2 |
| Ethyl oxybutyrate | 30 |
| Acetone | 10 |
| Ethylene dichloride | 60 |

Pigment may be incorporated in various ways, as for example, by grinding the pigment in the clear lacquer, or in a portion thereof in a ball mill or stone mill. A white lacquer enamel was prepared by grinding titanium oxide into the above clear lacquer. The exact amount of pigment in any given case is dependent on the color and hiding power of the pigment and the nature of the surface desired, i. e., gloss, satin or dull finish.

A resin made by heating 113 parts by weight of benzoyl benzoic acid with 15.5 parts glycerol provided a product of acid number 19.3, which likewise blended with cellulose acetate and which afforded appropriate lacquer compositions.

Instead of resin made from glycerol and a substituted benzoic acid, I may, as indicated in the first illustration, employ an acid such as succinic acid or its anhydride. Thus, instead of using the benzoic succinic glyceride resin, I may employ benzoyl benzoic succinic glyceride resin.

A pigmented lacquer suitable for brushing purposes was prepared as follows:

| | Parts by weight |
|---|---|
| Cellulose acetate (15 second viscosity) | 18–20 |
| Benzoyl benzoic succinic glyceride resin | 20–30 |
| Triacetin | 8 |
| Ethyl lactate | 100 |
| Ethyl acetate | 120 |
| Isopropyl alcohol | 180 |
| Zinc oxide | 20 |
| Chrome green | 1 |

The glycols such as ethylene and propylene glycols also are active and may be used to make resinous products, or more particularly balsams, using the molecular equivalents of the glycol in place of glycerol. In some cases mixtures of glycerol and glycol may be employed to secure specific consistencies.

While I prefer to employ benzoic acid, or substituted benzoic acids such as nitrobenzoic acid, benzoyl benzoic acid, toluyl benzoic acid, and the like, or mixtures thereof, I may employ other monobasic acids, such for example, as salicylic or maleic, or mixtures of these or other equivalent substances. Likewise, in building up a complex of suitable solubility, low acid number, light color, or other qualities which may be required in producing special resins, I may employ other dibasic acids in addition to succinic acid and phthalic acid or their anhydrides; the resins and balsams of the present invention embracing products made with other equivalent acids.

When desired the employment of cellulose acetate or nitrate may be dispensed with, the resin itself forming the essential or the sole coating medium. In such cases the choice of solvents is greater because the requirement of using a solvent for cellulose acetate, cellulose ethyl or methyl ether, and the like, does not obtain, and, therefore, solvents most appropriate for dissolving the resin may be used to advantage. Such coating compositions may contain additions of other synthetic resins or various natural resins, pigments, softening and plasticizing agents, and the like.

The foregoing compositions are not limited to the lacquer field, but may be employed as binding agents in making floor coverings, plastics, sheeted material, films, and so forth.

It should be noted, as stated in Serial No. 142,532 (page 24) I prefer to have the acid number of the resin below 30, preferably in the neighborhood of 20, or even in some cases lower than that degree of acidity when the resin is to be employed with some of the cellulose esters. The acid number, in some cases, is determined by the choice of pigment or by the nature of cellulose compound which may be employed with the resin.

The present application is a continuation in part of application, Serial No. 142,532, referred to above, and companion pending applications, Serial Nos. 1,497 and 137,380. Serial No. 1,497 filed January 9, 1925, is particularly directed to the fusible plastics and processes of making same, the claims of that application being particularly directed to molding compositions and molded articles including substantially permanently fusible synthetic resins, such as those of the glycerol organic acid resin type incorporated with nitrocellulose, and to processes of molding such compositions. Application, Serial No. 142,532, filed October 18, 1926, is more particularly directed to coating compositions containing cellulose derivatives and protecting resins, and the claims are more particularly directed to such coating compositions including protecting resins, and specifically resins of the phthalic glyceride type, which contain fatty acids of oils or the oils themselves incorporated in the resin complex, together with processes of making such resins. Application, Serial No. 137,380, filed September 23, 1926, is directed to films, and the claims are more particularly concerned with films containing multi-strata, one strata being devoid of pigment and the other preferably containing pigment, the non-pigmented strata being particularly of the nitrocellulose type, and including synthetic resins of the phthalic glyceride type and particularly those produced with oils or oil fatty acids.

The benzoic succinic glyceride resin first mentioned may be prepared at somewhat lower temperatures to advantage when a higher acid number is not objectionable. Using the same proportions, namely; benzoic acid 61, succinic 59, glycerol 46.5, but heating to 260° C. and maintaining at that temperature for 10 minutes yielded a very pale straw-colored soft sticky solid resin of acid number 67. This product was found to be soluble in acetone, ethyl acetate, the mono ethyl ether of ethylene glycol, in a mixture of alcohol and benzol, but was not readily soluble in amyl acetate. The resin blended well with cellulose acetate in various proportions, including those containing a much higher proportion of the resin than the cellulose ester. Clear transparent films resulted.

Nitrocellulose also may be incorporated in various proportions with this resin.

In the resin first described, using a temperature of 290° C. reaction was carried so far that the resin could not be used as advantageously in high proportion (i. e., major proportion) whereas, the resin made at 260° C. appeared to be blendable in any reasonable proportion, including products containing 1 part of cellulose acetate to several times the amount of the resin. Thus, in the various formulæ set forth above this resin may be used in quantity say twice or three times that of the amount of cellulose acetate.

A balsam having very high blending properties with cellulose acetate, especially acetate of low viscosity, is made as follows:

| | Parts |
|---|---|
| Succinic acid | 59 |
| Dihydroxy diethyl mono ethyl ether ("diethylene glycol") | 53 |

In this case the temperature can be carried to a relatively high point without the risk of incipient polymerization or conversion to insoluble and infusible products. The batch was heated to 290° C. and held at this temperature for 10 minutes yielding a pale straw-colored balsam of acid number 25.6. The balsam was soluble in a mixture of equal parts of ethyl alcohol and benzol, also in ethyl oxybutyrate, acetone, ethyl acetate, ethylene dichloride, mono ethyl ether of ethylene glycol, and the like. It resembled the benzoic succinic glyceride resin previously described, in not being readily soluble in amyl acetate.

The lacquers made from low viscosity cellulose acetate and these higher blendable resins and balsams may, if desired, contain pigments, dyes, or other coloring agents, or other suitable additions. Any desired solvent or solvent mixture for cellulose acetate, as a general rule, is a satisfactory solvent for these last described resins, since these have a solubility quite similar in some respects to that exhibited by cellulose acetate.

My invention insofar as relates to compositions containing cellulose acetate calls for cellulose acetate of low viscosity in the preferred embodiment thereof.

I may, for example, employ with low viscosity cellulose acetate a balsam prepared from benzoic acid, succinic acid and dihydroxy diethyl mono ether ("diethylene glycol"), these components of the balsams being reacted together in the proportion respectively 122, 118 and 159 parts by weight. The temperature is carried to 290° C. and held for ½ hour. The balsam prepared under these conditions was a pale-colored product of acid number 20.2 and was soluble in ketones and other solvents for cellulose acetate. Clear transparent films resulted. I may use the solution of low-viscosity cellulose acetate and the resin or balsam for films or coatings intended to remain in place; whereas, in producing films which are to be stripped from the supporting surface after the solvents have evaporated I may employ a high-viscosity cellulose acetate with the resin or balsam to advantage in many cases.

What I claim is:—

1. A coating composition comprising a benzoic polyhydric alcohol resin complex having an acid number below 30.

2. A coating composition comprising cellulose acetate and a benzoic polyhydric alcohol resin complex having an acid number below 30.

3. A film containing a benzoic polyhydric alcohol resin complex having an acid number below 30.

CARLETON ELLIS.